United States Patent

[11] 3,633,937

| [72] | Inventor | Emil J. Hlinsky<br>Oakbrook, Ill. |
|---|---|---|
| [21] | Appl. No. | 38,345 |
| [22] | Filed | May 18, 1970 |
| [45] | Patented | Jan. 11, 1972 |
| [73] | Assignee | MacLean-Fogg Lock Nut Co.<br>Mundelein, Ill. |

[54] VEHICLE SECUREMENT APPARATUS
13 Claims, 5 Drawing Figs.

[52] U.S. Cl. .................................................. 280/179 A, 105/369
[51] Int. Cl. ...................................................... B60p 7/08
[50] Field of Search .......................................... 280/179 A; 105/369 A, 376, 371, 370; 248/361 A

[56] References Cited
UNITED STATES PATENTS
994,822   6/1911   Daly .............................. 280/179 A 3,038,740   6/1962   Blunden .......................... 280/179 A

*Primary Examiner*—Benjamin Hersh
*Assistant Examiner*—Robert R. Song
*Attorney*—Davis, Lucas, Brewer & Brugman

ABSTRACT:

An anchor housing with a chain tiedown winch is slidable along an upwardly open channel fastened to the side of a flat bed trailer. The housing is movable to any position along the trailer deck where the winch is needed to secure a load on the deck. The housing has an elongated flange slidably engaging the underside of a downwardly facing track in one of the channel walls to anchor the housing against chain tension and enable it to slide along the channel. A pawl carried by the housing, engages one of several notches in the channel to hold it when endwise movement is not wanted. The winch is offset horizontally within the housing, toward the channel wall which has the downwardly facing track.

PATENTED JAN 11 1972

INVENTOR.
Emil J. Hlinsky
BY
Davis, Lucas, Brewer & Brugman
ATTORNEYS 3,633,937

INVENTOR.
Emil J. Hlinsky
BY
Davis, Lucas, Brewer & Brugman
ATTORNEYS

VEHICLE SECUREMENT APPARATUS

BACKGROUND OF THE INVENTION

The field of this invention is generally that of tiedown apparatus movable to, and releasably securable at positions along tiedown for loads on vehicles for the securement of loads to the vehicle carrying surface.

It is customary to transport loads on flatbed vehicles, such as trailers and railway flatcars, while securing the loads by flexible tie elements, such as chains, cables and straps.

The loads handled vary widely in shape, size and weight. Many kinds of apparatus have been developed for securing tiedown chains, straps and cables, to the deck. Conventional practice requires special tracks, or anchors, on or in the deck. Where they are on the deck, they mutilate the surface and often render the deck unsuitable for uses requiring a perfectly flat, smooth loading and unloading surface. Where the tracks or anchors are inset in the deck, they require special deck surfacing, having slots or grooves or openings. These fill up with mud, ice and foreign material, and are objectionable for many types of cargo.

SUMMARY OF THE INVENTION

It is a general object of the present invention to provide securement apparatus in which an anchor for a flexible tie element is movable through a range of adjusted positions along the side of a vehicle deck, and which avoids the conventional overlaid or recessed tracks and anchors which destroy the continuity of the surface.

In particular, it is an object of the present invention to provide a chain winch in an anchor housing movable along an upwardly open channel fixed to the side of a deck and below the level of a deck.

Another object is to secure the anchor housing in the channel, and yet enable it to be shifted to different operative positions along the deck, by engaging a slide flange fixed to the housing beneath a downwardly facing track fixed in one of the channel walls.

Another, specific, object is to provide a construction which shifts the line of action of the winch in a direction to urge the anchor housing in a direction to stabilize and maximize the engagement of sliding bearing surfaces between the housing and the channel member.

BRIEF DESCRIPTION OF THE DRAWINGS

Other objects and advantages of the invention will be apparent from the following description taken in connection with the accompanying drawings in which.

Like parts are indicated by like reference characters throughout the figures of the drawings.

DESCRIPTION OF THE PREFERRED EMBODIMENT

Figure 1:
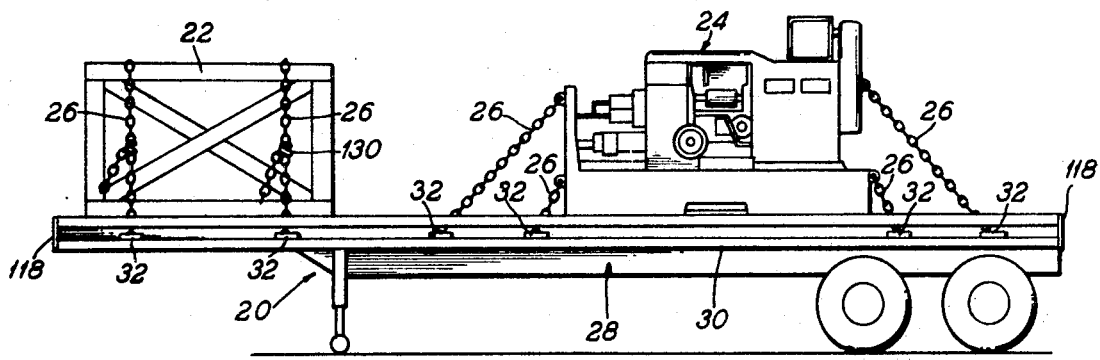
FIG. 1 is a schematic side view of a trailer unit, showing a crate and a machine packaged for shipment, both secured to the deck of the trailer by a preferred embodiment of the present invention.

Referring now to FIG. 1, a trailer unit 20 is illustrated having a crate 22 and a machine 24 packed for shipment. They are held by chains 26, which are secured by a preferred form of the present invention.

The securement apparatus is generally designated 28 in FIG. 1. It includes an elongated, horizontal channel 30, and one or more (in this case, six) anchor housings 32, each being movable along the channel 30.

Figure 2:
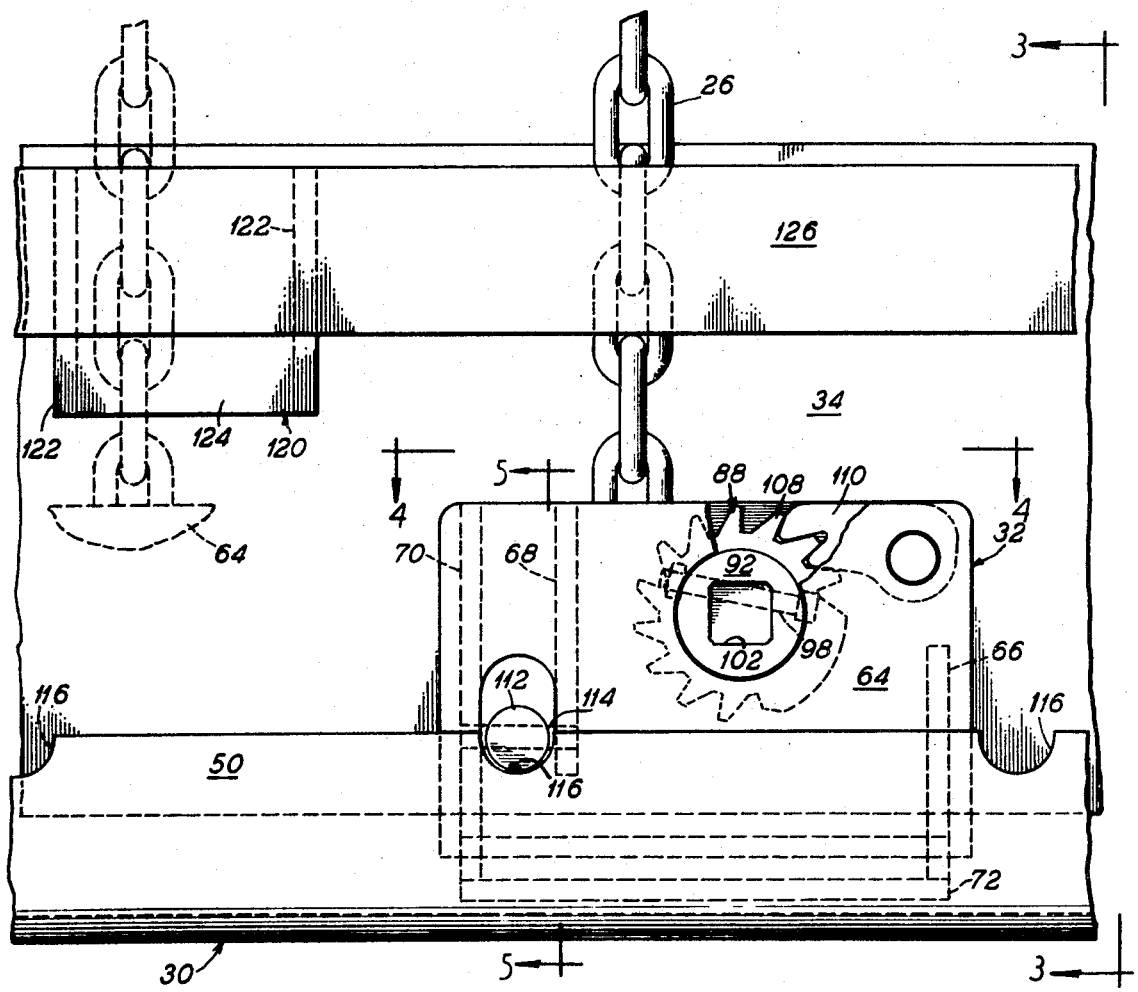
FIG. 2 is an enlarged, fragmentary view of FIG. 1.
Figure 3:
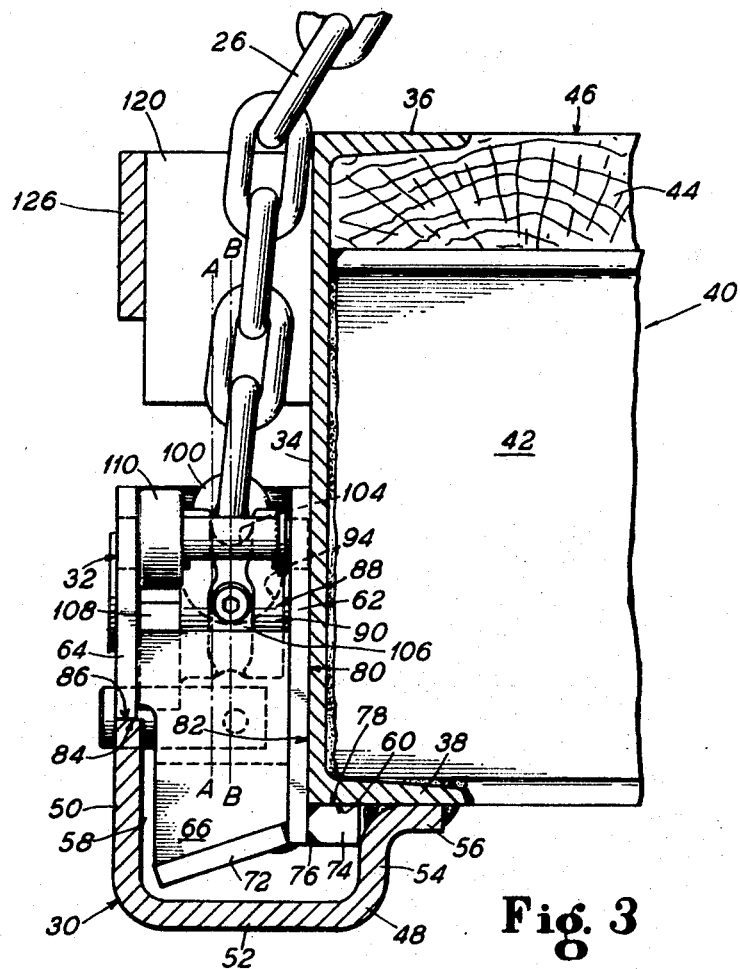
FIG. 3 is a vertical cross section of FIG. 2 taken on the line 3—3.

Referring to FIGS. 2 and 3, the channel member 30 is shown as a composite, fabricated assembly. It comprises an inner vertical wall having upper and lower flanges 36, 38 turned inward toward the deck. The deck is generally designated 40 in FIG. 3, and it is here shown comprising a number of transverse beams 42 affixed as by welding to the inner wall 34. Wood planking 44, atop the beams 42 provide a customary top surface 46. Note that the surface 46 is a smooth, flat continuation of the upper flange 36 of sidewall 34.

The channel 30 also includes a modified U-shaped channel section 48 having an upstanding wall 50, a bottom wall 52, an inner upstanding wall 54, and a horizontal flange 56 which is welded, as shown, to the bottom flange 38 of wall 34.

Thus, the channel 30 is adapted to be fastened to one side of a deck 40 of a standard trailer unit, and it comprises an inner, upstanding wall 34 and an outer, upstanding wall 50, spaced outwardly from the inner wall 34 and defining an upwardly open guideway 58 therebetween, which extends along the side of the deck.

One of the walls of the channel member 30 has a horizontally extending downwardly facing track or flange. This may be on either of the walls 34 or 50. In the particular case illustrated here, it is a downwardly facing track surface 60 on the bottom of flange 38. This is a bearing surface, and a sliding surface, which engages the anchor housing now to be described.

Refer to FIGS. 2 and 3. One of the anchor housings 32 will now be described. Each is in the form of a box section. An inner plate 62 and an outer plate 64, spaced therefrom, are interconnected by strengthening, vertical side and intermediate plates 66, 68, 70. A bottom cross plate 72 completes the frame of the anchor housing 32, the parts being welded into the assembly as shown.

The anchor housing has a horizontally extending slide flange 74, welded as at 76 to the inner, lower end portion of housing plate 62. The slide flange 74 has a smooth, horizontal, machined upper surface 78, which is engaged beneath the downwardly facing track surface 60, previously described, and is movable relative thereto.

The inner plate 62 has a back surface 80, which is slidable relative to the outer surface 82 of the inner wall 34. The housing 32 has a lower surface 84 (on plate 64) which is slidable relative to the upper surface 86 of the outer wall 50.

A chain tiedown winch means, generally designated 88, is journaled for rotation between the inner and outer housing plates 62, 64. This may, for example, be a unit similar to that shown in Schwiebert, et al. U.S. Pat. No. 3,454,260, to which reference may be made for detail.

Briefly, a winch drum 90 has integral axle portions 92, 92 extending into accommodating openings in plates 62 and 64.

The winch drum 90 includes a radial slot 94 therein, and a cross bore 96 containing a bolt 98 holding fast the first chainlink 100 in the slot 94. A socket 102 is provided in the exterior axle portion 92, for coupling reception with a ratchet wrench or power tool. Guide grooves 104, 106, etc., extend centrally around the periphery of the drum 90 and provide nesting reception for links of chain 26 used to secure the loads as shown in FIG. 1.

A ratchet wheel 108, integral with the drum 90, and gravity-biased pawl 110, enable the chain 26 to be tightened and held in taut condition to retain a load.

Figure 4:
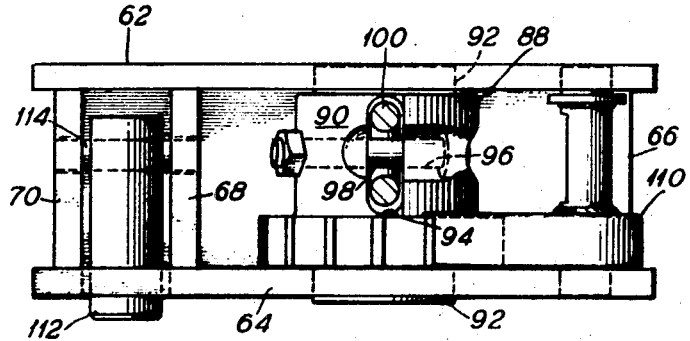
FIG. 4 is a fragmentary plan view of FIG. 2 taken on the line 4—4.
Figure 5:
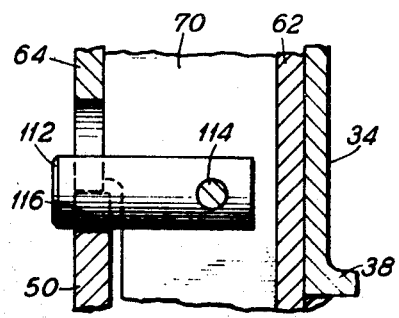
FIG. 5 is a fragmentary, vertical, cross section of FIG. 2 taken along line 5—5.

Manually releasable means for interlocking the anchor housing 32 to the channel 30 at a plurality of positions of the housing along the guideway 58, is as follows. As best shown in FIGS. 2, 4 and 5, a rodlike pawl 112 is pivoted for up-and-down movement between the positions indicated in FIG. 5, about a pin 114 fast between vertical plates 68, 70 in the anchor housing. A plurality of upwardly open notches 116 are formed in the upper edge of outer wall 50 of the channel member. As shown in FIG. 2, the pawl 112 will be seated by gravity in one of the notches 116, to hold the anchor housing 30 against longitudinal movement within the guideway 58. To free the anchor housing for movement along the channel, the end of the pawl 112 is readily accessible and may be lifted by hand.

An important feature of the invention is the arrangement whereby the line of action of the chain 26, when tensioned, urges the housing toward the channel wall having the downwardly facing track. Specifically, referring to the center lines A—A and B—B, the center of the anchor housing 30 is designated by the line A—A. The line of action of the chain is shown by the line B—B. As the result of the construction which shifts the winch drum 90 offcenter toward the inner plate 62, the line of action B—B is likewise shifted to the right of line A—A. This causes the tension in the chain to urge the anchor housing 32 to the right in FIG. 3 and maintain maximum engagement between the sliding surfaces 60 and 78. This stabilizes the assembly by biasing it in the same direction, namely, for maximum engagement of the flange 74 and the downwardly facing track surface 60, at all times.

Referring to FIG. 3, the spacing of the inner and outer walls 34, 50 of the channel member is such that the anchor housing 32 will remain in place even when the corresponding chain is untensioned. The anchor housings are assembled through the ends of the channel 30 and end plates 118 (FIG. 1) are provided to prevent inadvertent loss.

The conventional U-shaped loops of formed sheet steel constituting stake pockets 120, are provided at intervals of approximately every 2 feet along the upper edge of the inner channel wall 34. These comprise upstanding plates 122, 122 bridged by a plate 124. A chain-retaining strip is fastened as by welding across the stake pockets to provide intermediate chain retainers and guides between the stake pockets 120. As shown in the full line representation in FIG. 2 and in FIG. 3, the chain 26 is threaded through the space between the strip 126 and inner wall 34 between pockets 120, the tensioned chain bearing on the externally facing upper corner of the inner wall 34 as it passes upward to the load on deck 46.

For additional, more restricted, training of the chain to meet certain loading conditions, the chain may be trained directly through a suitably positioned one of the stake pocket loops 120, as shown in broken lines in FIG. 2.

By enabling the training of the chain through stake pockets 120, or between the stake pockets and still retained by the strip 126, a wide variety of training dispositions for the chain is available to accommodate the different angular dispositions of the chains 26, shown in FIG. 1, as well as many others.

Use and operation are believed to be evident in view of the description above. Briefly, for securing a load, such as the crate 22 in FIG. 1, the two chains 26 will be affixed on the reverse side of FIG. 1 where an identical arrangement of channel 30 and anchors 32 may be provided. After overlapping, intermediate ends of the chain (as shown diagrammatically in FIG. 1) are snugged up to their last link. A ratchet tool inserted in the square socket 102 of each winch drum will pull the chains tight and secure the carton 22 on the deck.

I claim:

1. Securement apparatus for securing cargo to a vehicle deck comprising:
   an elongated horizontal channel adapted to be fastened to one side of the deck below the level of the deck;
   said channel having an inner wall adjacent the side of the deck and an outer wall spaced outwardly from the inner wall and defining an upwardly open guideway therebetween extending along the side of the deck;
   one of said walls having a horizontally extending, downwardly facing track;
   an anchor housing being movable along said channel within said guideway;
   said anchor housing having an extension on one side underlying and engaging said downwardly facing track on said one channel wall, said anchor housing having an opposite side sufficiently close to the other channel wall to keep the extension so engaged with the underside of the track through the entire range of movement of the anchor housing along the deck;
   winch means for a chainlike cargo securing element, said winch means being supported by said anchor housing to provide access from the deck for such element through the entire range of movement of the housing along the deck; and
   manually releasable means for interlocking the housing to the channel at a plurality of positions of the housing along the guideway.

2. Securement apparatus according to claim 1 in which the extension on the housing is an elongated slide member fastened to the housing and engageable with and slidable along said downwardly facing track.

3. Securement apparatus according to claim 1 in which a plurality of stake pockets, open at the top and bottom, are disposed along an upper portion of said inner wall in generally vertical alignment with the winch means, to train and guide a chainlike element through a selected one of said pockets between the winch means and cargo.

4. Securement apparatus according to claim 3 in which said stake pockets comprise outwardly extending loops, and a horizontal retaining strip interconnects the stake pocket loops and is spaced outwardly from said inner wall to enable a chainlike element to be trained and guided beneath the strip.

5. Securement apparatus according to claim 1 in which the winch means is so positioned in the anchor housing that the line of action of the chainlike element, when tensioned, urges the housing toward said one-channel wall having said downwardly facing track.

6. Securement apparatus according to claim 1 in which the means for interlocking the housing to the channel comprises a plurality of upwardly open notches spaced apart along the upper edge portion of the outer wall of the channel, and a downwardly biased pawl carried by the anchor housing for engagement with a selected one of said notches, said pawl being accessible from the exterior of the channel and manually releasable.

7. Securement apparatus according to claim 1 in which said horizontally extending, downwardly facing track is on the inner wall of the housing.

8. Securement apparatus according to claim 7 in which said winch means is horizontally offset toward the inner wall whereby the line of action of the chainlike element, when tensioned by the winch, urges the housing toward the inner wall to maintain maximum engagement between said housing extension and said track.

9. Securement apparatus for securing cargo to a top load carrying surface of a vehicle deck, said deck having a channel extending horizontally along at least one side thereof, which channel has angularly related side and bottom surfaces which are exposed outwardly away from the deck, said securement apparatus comprising:
   an anchor housing adapted to be supported at selected positions along said channel, said anchor housing having winch means for tensioning a flexible tie element trained laterally across the side surface of the channel and upwardly of the side of the deck, thereby to extend between said anchor housing and said cargo on the deck;
   said anchor housing including a side wall having only a single lower transverse extension thereon, which housing sidewall and transverse extension simultaneously and respectively engage the side and bottom surfaces of said channel; and
   means at the bottom of the channel for holding said anchor housing in close proximity with said side surface of said channel to maintain a substantial lapped relationship between said lower transverse extension and said bottom surface of said channel to enable and cause said lower transverse extension and said channel to absorb the force reaction of the flexible tie element and thereby to restrain said housing against upward movement laterally of the channel when said flexible tie element is tensioned by said winch.

10. Securement apparatus according to claim 9 in which said sidewall and said transverse extension of said anchor housing are slidable along said channel for moving said anchor housing between said positions.

11. Securement apparatus according to claim 10 having locking means between said channel and said anchor housing to hold said anchor housing against slidable movement along said channel in selectable securement positions.

12. Securement apparatus for securing cargo to a vehicle deck, said deck having an elongated horizontally extending channel along at least one side thereof, a series of outwardly extending stake pocket loops which are open at their tops and bottoms and are disposed along said channel, said channel including a vertical web having a lower marginal flange, said securement apparatus comprising:
   an anchor housing adapted to be supported throughout a range of securement positions along the length of said channel, said anchor housing having winch means for tensioning a flexible tie element trained across the side of the deck and extending between said anchor housing and said cargo on said deck;
   said anchor housing having a sidewall and a lower transverse extension simultaneously abuttable respectively with said vertical web and with the underside of said lower marginal flange to dispose said winch means at a level below said stake pocket loops and in alignment therewith to enable said flexible tie element to be trained across a selected one of said stake pocket loops to stabilize the fore and aft position of said anchor housing relative to said channel; and
   means for maintaining a substantial lapped relationship between said lower transverse extension and said underside of said lower flange to stabilize the transverse position of said anchor housing relative to said channel and to enable said lower transverse extension and said channel to absorb the force reaction of said flexible tie element and to restrain said housing against upward movement when said flexible tie element is tensioned by said winch.

13. Securement apparatus for securing cargo to a vehicle deck having a beam extending longitudinally along one side thereof and presenting outwardly exposed and angularly related side and lower surfaces, said securement apparatus comprising:
   a housing;
   a winch carried by said housing for rotation about an axis for tensioning a flexible cargo tiedown element which extends upwardly and laterally across said exposed side surface of the beam;
   said housing having an upstanding sidewall relative to which the winch axis extends in generally perpendicular relationship from one surface, and which has an opposed surface adapted to abuttably and slidably engage the side surface of said beam on the vehicle deck;
   said housing having a lower, transverse extension providing an upper surface adapted abuttably and slidably to engage the lower surface of said beam when the cargo tiedown element is tensioned by the winch;
   said housing being movable to a selected position along said beam and said lower transverse extension being effective to absorb the force reaction of said tiedown element when the latter is tensioned by said winch; and
   means remote from the top of the beam for retaining the housing and beam surfaces in adjacent relationship when the cargo tiedown element is not under tension.

* * * * *